(No Model.)
W. T. PARSONS.
UNICYCLE.
No. 595,073. Patented Dec. 7, 1897.
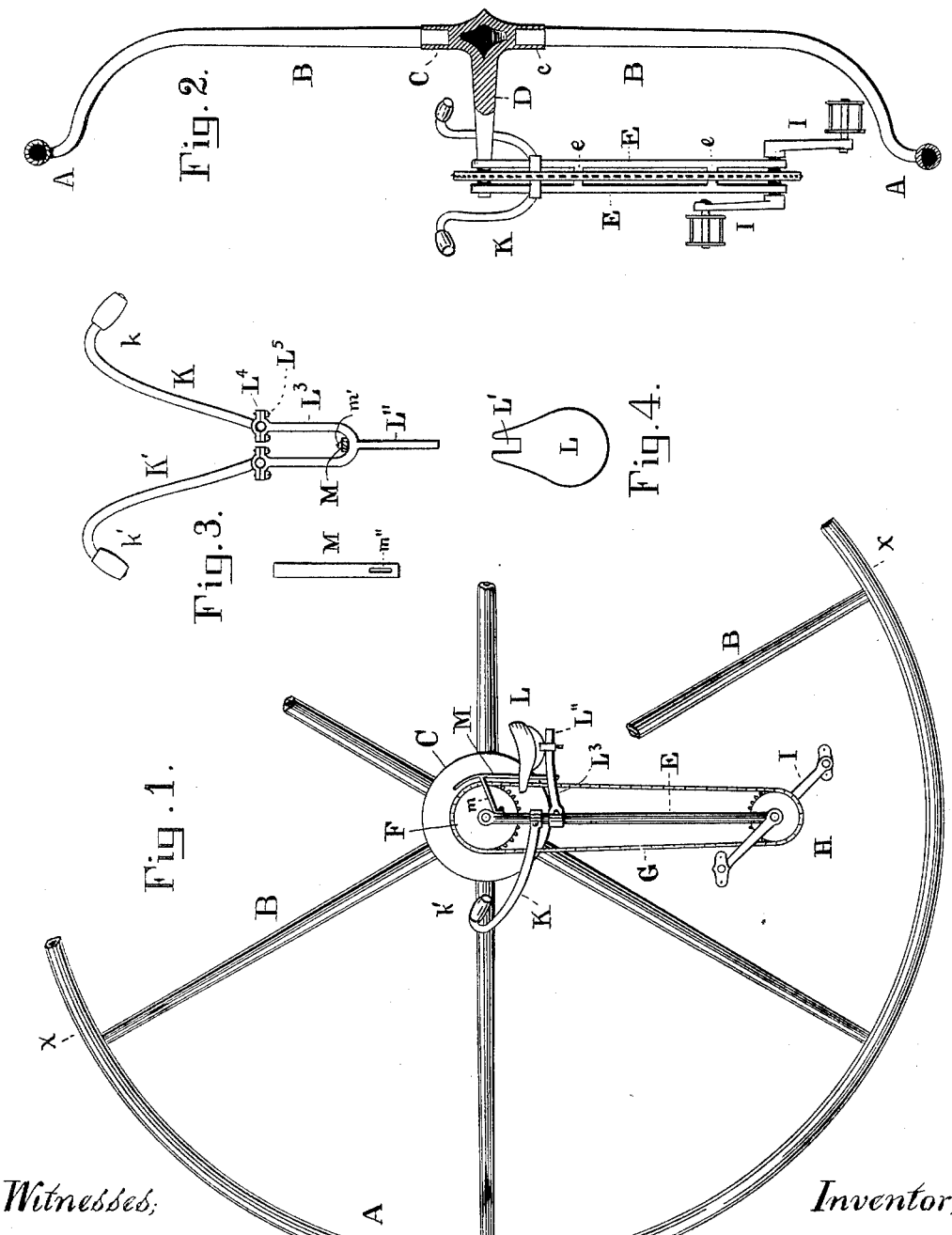
Witnesses:
Carroll Turner.
Mary D. Upham
Inventor,
William T. Parsons,
By A. B. Upham,
Atty

UNITED STATES PATENT OFFICE.

WILLIAM T. PARSONS, OF BOSTON, MASSACHUSETTS.

UNICYCLE.

SPECIFICATION forming part of Letters Patent No. 595,073, dated December 7, 1897.

Application filed February 1, 1897. Serial No. 621,406. (No model.)

*To all whom it may concern:*

Be it known that I, WILLIAM T. PARSONS, a citizen of the United States, residing at Boston, in the county of Suffolk and State of Massachusetts, have invented a new and useful Unicycle, of which the following is a full, clear, and exact description.

This invention is in the line of vehicles in which the rider sits within and propels a single large wheel; and the objects which I endeavor to attain by my construction are the simplification of parts and rendering the same lighter in weight, easier in operation, and more practical both in manufacture and in use. These improvements I secure by the construction illustrated in the drawings forming part of this specification, and in which—

Figure 1 is a side elevation of my unicycle. Fig. 2 is a sectional elevation of the same through $x$ $x$ in Fig. 1, and Figs. 3 and 4 are detail views of parts thereof.

Referring to the drawings, A is the rim, preferably provided with a pneumatic tire. B are the spokes thereof, slightly tapering for the purpose of increasing their resistance to a bending strain, and C is the hub, in which said spokes are rigidly secured. The shaft D, rigidly projecting inward from said hub, also made somewhat tapering to similarly increase its strength, has depending from its extremity the twin bars E. These bars are revolubly mounted on said shaft and are immovably connected one to the other by means of the short bars $e$, brazed or otherwise fixed to each. Between the upper ends of said bars E and rigidly mounted on the shaft D is the sprocket-wheel F, and at the lower ends of said twin bars E is a similar but somewhat smaller sprocket-wheel H, connected thereto by the sprocket-chain G. The proportion between said sprockets should be such that the unicycle is geared down to what would be known as "65"—that is, each complete revolution of the pedals would give a rim velocity equal to that of a wheel sixty-five inches in diameter.

The pedals I are of the usual construction, the spokes B being given a suitable bend to avoid interference both with the pedals and the feet of the rider thereon.

The hub C is formed with sockets $c$, into which are rigidly set the ends of the spokes B. As it is very necessary that the rider shall be seated as nearly over the pedals as possible I split the forward end of the saddle L, in order that the chain G may pass through the pommel thereof when it is moved well forward. The saddle-post L″ is similarly bifurcated for the passage of the chain, and the ends of these forks L³ are clamped to the bars E, as indicated in Fig. 3. This clamping device consists simply of the straps L⁴ and clamping-screws L⁵. By this means the saddle is permitted a vertical adjustment to suit the person riding thereon. In the same way the handle-bars K are adjustably secured to the bars E, being thereby permitted both vertical adjustment and horizontal adjustment toward and from each other.

To protect the person of the rider, I attach the guard M by means of the braces $m$ to the bars E and also by means of a screw $m'$ to the forked post L″. Said screw passes through a slot $m''$ in the guard M in order that the same shall not interfere with the vertical adjustment of the saddle.

In using my unicycle the rider seats himself upon the saddle, well forward, and grasps the handle-bars, with his body so inclined as to bring his shoulders somewhat in advance of the shaft D, in order that his center of gravity shall be near as possible in line with the bars E. In this position the pendulous bars E are retained in a vertical position and the weight of the rider brought more nearly over the pedals.

What I claim as my invention, and desire to secure by Letters Patent, is as follows, to wit:

1. In a unicycle, the combination with the wheel having offset-spokes and shaft, D, rigidly connected therewith, of the sprocket-gear fixed upon said shaft near its end, the twin bars, E, journaled on said shaft, one at each side of said gear, but immovably joined the one to the other, the pedal-shaft journaled at the lower end of said twin bars, the sprocket-gear mounted thereon between said twin bars, sprocket-chain joining said gears, the forked saddle-post adjustably supported by said twin bars, the saddle mounted thereon, having split pommel, the guard, and the handle-bars also adjustably supported by said twin bars, the whole so arranged that the person riding the machine shall have his arms and upper portion of his body above said shaft, D, while his feet and legs shall come below the same and counterbalance said upper portion of his body, substantially as and for the purpose set forth.

2. In a unicycle, the combination with the wheel having shaft, D, of the sprocket mounted on said shaft, the saddle, L, depending from said shaft in line with said sprocket and having split pommel, L', and the guard, M, for the purpose set forth.

3. In a unicycle, the combination with the wheel having the shaft, D, of the twin bars journaled on said shaft, the sprockets and chain located between said bars, the forked saddle-post, L'', adjustably secured to said bars, and the guard, M, having brace, $m$, and adjustable connection with said saddle-post, substantially as and for the purpose set forth.

In testimony that I claim the foregoing invention I have hereunto set my hand and seal this 26th day of January, in the year 1897.

WILLIAM T. PARSONS. [L. S.]

Witnesses:
    MARY U. UPHAM,
    A. B. UPHAM.